United States Patent
Ishikawa et al.

(10) Patent No.: US 7,088,065 B2
(45) Date of Patent: Aug. 8, 2006

(54) DRIVE UNIT AND VEHICLE EQUIPPED THEREWITH

(75) Inventors: Tatsuhiro Ishikawa, Nishikamo-gun (JP); Hiroshi Yoshida, Chiryu (JP); Hitoshi Sato, Kagamihara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 375 days.

(21) Appl. No.: 10/775,239

(22) Filed: Feb. 11, 2004

(65) Prior Publication Data

US 2004/0159480 A1    Aug. 19, 2004

(30) Foreign Application Priority Data

Feb. 14, 2003 (JP) .............................. 2003-036757

(51) Int. Cl.
*H02P 3/14* (2006.01)
(52) U.S. Cl. .............. 318/376; 318/375; 318/139; 320/124; 307/9.1; 307/48; 307/74
(58) Field of Classification Search ................ 318/376, 318/375, 139; 320/124; 307/9.1, 48, 74
See application file for complete search history.

(56) References Cited

U.S. PATENT DOCUMENTS

| | | | | |
|---|---|---|---|---|
| 4,060,754 A | * | 11/1977 | Kirtley et al. | 318/768 |
| 6,175,217 B1 | * | 1/2001 | Da Ponte et al. | 322/19 |
| 6,476,571 B1 | * | 11/2002 | Sasaki | 318/139 |
| 6,583,519 B1 | * | 6/2003 | Aberle et al. | 307/10.1 |
| 6,777,909 B1 | | 8/2004 | Aberle et al. | 320/104 |
| 6,815,100 B1 | | 11/2004 | Aoyagi et al. | 429/13 |
| 6,954,004 B1 | * | 10/2005 | Skeist et al. | 290/44 |
| 7,005,206 B1 | * | 2/2006 | Lawrence et al. | 429/34 |
| 2003/0107352 A1 | * | 6/2003 | Downer et al. | 322/40 |
| 2003/0118876 A1 | | 6/2003 | Sugiura et al. | 429/9 |
| 2004/0013927 A1 | * | 1/2004 | Lawrence et al. | 429/34 |
| 2004/0185317 A1 | | 9/2004 | Aoyagi et al. | 429/23 |

FOREIGN PATENT DOCUMENTS

| | | |
|---|---|---|
| JP | A 6-253409 | 9/1994 |
| JP | A 7-264715 | 10/1995 |
| JP | A 2001-357865 | 12/2001 |
| JP | A 2003-518357 | 6/2003 |

* cited by examiner

Primary Examiner—Rita Leykin
(74) Attorney, Agent, or Firm—Oliff & Berridge, PLC

(57) ABSTRACT

A drive unit of the invention comprises a motor that can input/output motive power to/from a drive shaft, a drive circuit that performs drive control of the motor, a fuel cell that is connected to the drive circuit without the intervention of a voltage converter such that electric power can be output, a charge/discharge portion that is connected to the fuel cell in parallel and to the drive circuit such that electric power can be output and that has at least one capacitor whose voltage in a fully charged state is higher than an inter-open-terminal voltage of the fuel cell, a diode that is installed between the fuel cell and the charge/discharge portion such that electric power can be output only in a direction from the fuel cell to the charge/discharge portion, and a drive control portion that controls the drive circuit such that drive control of the motor is performed on the basis of required motive power to be transmitted to the drive shaft. This drive unit is characterized in that the drive circuit performs drive control of the motor through the output of electric power from the charge/discharge portion or the output of electric power from the charge/discharge portion and the fuel cell.

11 Claims, 7 Drawing Sheets

DRIVE UNIT AND VEHICLE EQUIPPED THEREWITH

INCORPORATION BY REFERENCE

The disclosure of Japanese Patent Application No. 2003-036757 filed on Feb. 14, 2003 including the specification, drawings and abstract is incorporated herein by reference in its entirety.

BACKGROUND OF THE INVENTION

1. Field of the Invention

The invention relates to a drive unit and a vehicle equipped therewith.

2. Description of the Related Art

Heretofore, there has been proposed a drive unit of this type wherein a fuel cell, a secondary battery, a large-capacitance capacitor, and an electrolyzer are connected in parallel to a drive circuit for driving a motor without the intervention of a voltage converter and wherein a first switch for cutting the fuel cell and the secondary battery off from the drive circuit and a second switch for cutting the electrolyzer off are provided (Japanese Patent Application Laid-Open No. 6-253409 (FIGS. 1 and 2, page 4)). The first and second switches are on and off respectively during normal operation of this unit. When regenerative control of the motor is performed, the first switch is turned off to cut the fuel cell and the secondary battery off from the drive circuit, so that the large-capacitance capacitor is charged using regenerative power. If an inter-terminal voltage of the large-capacitance capacitor rises above an inter-terminal voltage of the secondary battery, the second switch is turned on, so that the electrolyzer electrolyzes water using regenerative power and electric power obtained from the large-capacitance capacitor. Hydrogen and oxygen obtained by electrolyzing water are used as fuel for the fuel cell.

In the drive unit thus constructed, however, every time regenerative control of the motor is performed, the first switch needs to be turned off to cut the fuel cell and the secondary battery off from the drive circuit. In the case where regenerative control of the motor is frequently performed, the more complicated the control becomes, the more the load applied to the first switch increases.

This drive unit is provided with the secondary battery and the electrolyzer. Therefore, if the drive unit becomes complicated, both the secondary battery and the electrolyzer become complicated. For size reduction or simplification of the unit, the unit may dispense with the secondary battery and the electrolyzer. In this case, however, when the fuel cell is connected again after having been cut off by the first switch, a large current may flow between the fuel cell and the large-capacitance capacitor if the inter-terminal voltage of the large-capacitance capacitor assumes a certain value. Such a large current causes an inconvenience such as reduction of a life span of the switch.

SUMMARY OF THE INVENTION

In a drive unit provided with a charge/discharge portion and a fuel cell connected in parallel to a drive circuit for driving a motor without the intervention of a voltage converter, and in a vehicle equipped with the drive unit, it is an object of the invention to maintain high operating efficiency of the fuel cell even if the fuel cell is not cut off from the drive circuit during regenerative control of the fuel cell.

The drive unit of the invention and the vehicle equipped therewith have adopted the following means so as to achieve at least part of the above-stated object.

A drive unit in accordance with one aspect of the invention comprises a motor, a drive circuit, a fuel cell, a charge/discharge portion, a diode, and a drive control portion. The motor can input/output motive power to/from a drive shaft. The drive circuit performs drive control of the motor. The fuel cell is connected to the drive circuit without the intervention of a voltage converter such that electric power can be output. The charge/discharge portion is connected to the fuel cell in parallel and to the drive circuit such that electric power can be output, and has at least one capacitor whose voltage in a fully charged state is higher than an inter-open-terminal voltage of the fuel cell. The diode is installed between the fuel cell and the charge/discharge portion such that electric power can be output only in a direction from the fuel cell to the charge/discharge portion. The drive control portion controls the drive circuit such that drive control of the motor is performed on the basis of required motive power to be transmitted to the drive shaft. The gist of this aspect of the invention consists in that the drive circuit performs drive control of the motor through the output of electric power from the charge/discharge portion or the output of electric power from the charge/discharge portion and the fuel cell.

In the drive unit of the aforementioned aspect, when regenerative control of the motor is performed, the charge/discharge portion having at least one capacitor whose working voltage is set such that a voltage in a fully charged state stays above an inter-open-terminal voltage of the fuel cell is charged with regenerative power obtained. At this moment, the inter-terminal voltage of the charge/discharge portion becomes higher than the inter-open-terminal voltage of the fuel cell in some cases. However, since the diode is installed and oriented in such a direction that the fuel cell can charge the charge/discharge portion, no reverse current flows through the fuel cell. As a result, there is no need to cut the fuel cell off from the drive circuit during regenerative control of the motor. In the drive unit of the invention, when power running control of the motor is performed after regenerative control of the motor as mentioned above, the motor is driven by an output from the charge/discharge portion if the inter-terminal voltage of the charge/discharge portion is higher than the inter-open-terminal voltage of the fuel cell, and by outputs from the fuel cell and the charge/discharge portion if the inter-terminal voltage of the charge/discharge portion has dropped to the inter-open-terminal voltage of the fuel cell. That is, a phenomenon that can be caused by connection of the fuel cell when the inter-terminal voltage of the charge/discharge portion is lower than the inter-open-terminal voltage of the fuel cell, namely, a phenomenon of the flow of a large current between the fuel cell and the charge/discharge portion can be avoided.

In the drive unit of the aforementioned aspect, the fuel cell may be connected such that electric power can be output to the drive circuit via the charge/discharge portion.

In addition, the drive unit of the aforementioned aspect may further comprise a voltage detection portion that detects an inter-terminal voltage of the charge/discharge portion, and the drive control portion may control the drive circuit in such a manner as to increase regenerative power produced through regenerative control of the motor if an inter-terminal voltage detected by the voltage detection portion during regenerative control of the motor is between an inter-open-terminal voltage of the fuel cell and a predetermined voltage lower than the inter-open-terminal voltage. In this construction, a state in which the inter-terminal voltage of the charge/discharge portion is between the inter-open-terminal voltage of the fuel cell and the predetermined voltage can be passed quickly. Therefore, in the case where a fuel cell to be used does not exhibit particularly high operating efficiency when being operated at a voltage between the inter-open-terminal voltage and the predetermined voltage, suppression of a fall in operating efficiency of the fuel cell, namely, enhancement of operating efficiency of the fuel cell can be achieved. In addition, the drive unit of the aforementioned aspect may further comprise a braking force application portion that applies a braking force to the drive shaft through mechanical operation and that is drivingly controlled by the drive control portion, and if the required motive power to be transmitted to the drive shaft is a braking force, the drive control portion divides the required motive power into a first braking force that is to be produced through regenerative control of the motor and a second braking force that is to be produced by the braking force application portion, and controls the drive circuit and the braking force application portion such that the first braking force and the second braking force are applied to the drive shaft; and the drive control portion then controls the drive circuit and the braking force application portion such that the first braking force increases if an inter-terminal voltage detected by the voltage detection portion during regenerative control of the motor is within a predetermined range including an inter-open-terminal voltage of the fuel cell. In this construction, regenerative power can be increased without changing a braking force to be applied to the drive shaft.

In addition, the drive unit of the aforementioned aspect may further comprise a cut-off portion that can cut the fuel cell off from the drive circuit, and the drive control portion may control the cut-off portion such that the fuel cell is not cut off from the drive circuit when motive power is input to or output from the drive shaft by the motor. In this construction, the cut-off portion can be inhibited from deteriorating due to an increase in the load applied thereto. The drive control portion may also control the cut-off portion such that the fuel cell is not cut off from the drive circuit either when regenerative control of the motor is performed.

Furthermore, in the drive unit of the aforementioned aspect, the charge/discharge portion may be composed of a plurality of capacitors that are connected in parallel. The charge/discharge portion may have a connection switch for connecting or disconnecting at least one of the capacitors. In this construction, only one or some of the capacitors can be used. In addition, the drive unit of the aforementioned aspect may further comprise a voltage detection portion that detects an inter-terminal voltage of the charge/discharge portion, and the drive control portion may control the connection switch such that the at least one of the capacitors is disconnected if regenerative control of the motor is performed, and such that the at least one of the capacitors that has been disconnected is connected if an inter-terminal voltage detected by the voltage detection portion becomes higher than an inter-open-terminal voltage of the fuel cell by a predetermined voltage with the at least one of the capacitors having been disconnected. In this construction, a state in which the inter-terminal voltage of the charge/discharge portion is between the inter-open-terminal voltage of the fuel cell and the predetermined voltage can be passed quickly. Therefore, in the case where a fuel cell to be used does not exhibit particularly high operating efficiency when being operated at a voltage between the inter-open-terminal voltage and the predetermined voltage, suppression of a fall in operating efficiency of the fuel cell, namely, enhancement of operating efficiency of the fuel cell can be achieved.

In another aspect of the invention, there is provided a method of controlling a drive unit having a motor that can input/output motive power to/from a drive shaft, a drive circuit that performs drive control of the motor, a fuel cell that outputs electric power to the drive circuit, a charge/discharge portion that is connected to the fuel cell in parallel and that outputs electric power to the drive circuit, a braking force application portion that applies a braking force to the drive shaft through mechanical operation, and a drive control portion that controls the drive circuit and the braking force application portion such that drive control of the motor is performed on the basis of required motive power to be transmitted to the drive shaft. This method comprises the steps of measuring electric power input to the drive circuit, determining whether or not the required motive power to be transmitted to the drive shaft is a braking force, and applying a braking force produced through regenerative control of the motor to the drive shaft as a force larger than a braking force produced by the braking force application portion if the required motive power is a braking force while the electric power is within a predetermined range.

The drive unit of the aforementioned aspect can be mounted not only in a vehicle having axles at least one of which is mechanically connected to a drive shaft of a drive unit but also in a non-vehicular moving object such as a ship, an aircraft, or the like.

DETAILED DESCRIPTION OF THE PREFERRED EMBODIMENTS

Figure 1:
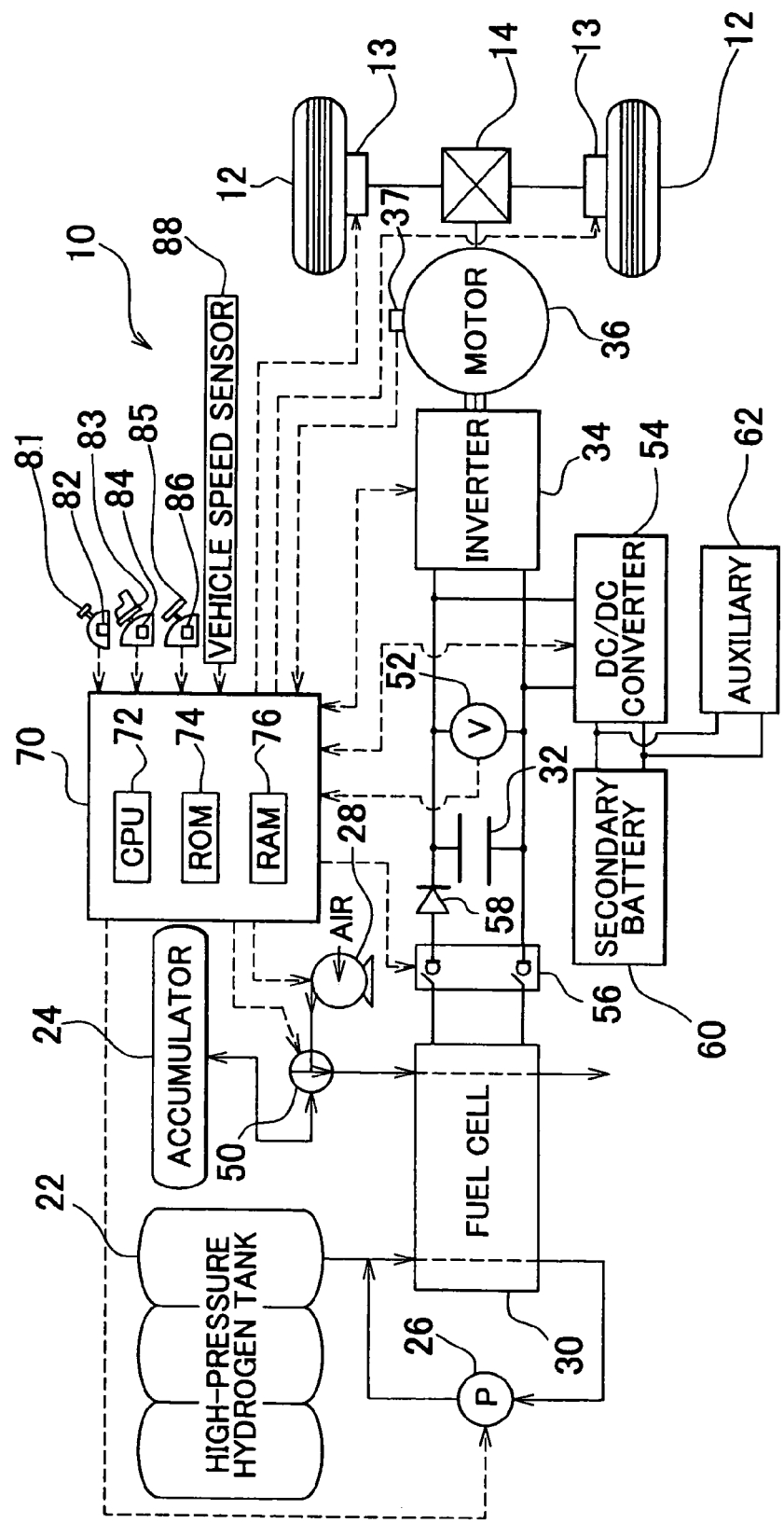
FIG. 1 is a block diagram showing the overall construction of an electric vehicle 10 in accordance with one embodiment of the invention.

Next, modes of implementing the invention will be described with reference to embodiments thereof. FIG. 1 is a block diagram showing the overall construction of an electric vehicle 10 in accordance with one embodiment of the invention. As shown in FIG. 1, the electric vehicle 10 of the embodiment is provided with a fuel cell 30, a capacitor 32, an inverter 34, a traction motor 36, and an electronic control unit 70. The fuel cell 30 generates electricity using hydrogen gas and oxygen contained in air. The hydrogen gas is a fuel gas supplied from a high-pressure hydrogen tank 22 and caused to circulate by a circulation pump 26, and the oxygen is supplied from an air compressor 28 and an accumulator 24 via a change-over valve 50. The capacitor 32 is connected in parallel to the fuel cell 30 via a circuit breaker 56. The inverter 34 converts direct-current power transmitted from the fuel cell 30 and the capacitor 32 into three-phase alternating current power. The traction motor 36 is driven by the three-phase alternating current power produced by the inverter 34 through conversion, and outputs motive power to driving wheels 12 via a differential gear 14. The electronic control unit 70 controls the electric vehicle 10 as a whole.

Although not shown, the fuel cell 30 is constructed of a fuel cell stack obtained by laminating a plurality of single cells and separators. Each of the single cells is composed of an electrolytic membrane and an anode and a cathode sandwiching the electrolytic membrane. Each of the separators serves as a partition between adjacent ones of the single cells. The fuel cell 30 generates electricity through an electrochemical reaction of air supplied to the cathode with hydrogen gas supplied to the anode through each of gas flow passages formed in the separators. Although not shown, a circulation passage through which a cooling medium (e.g., cooling water) can circulate is formed in the fuel cell 30. Because the cooling medium circulates inside the circulation passage, the temperature in the fuel cell 30 is maintained at a suitable temperature (e.g., 65 to 85° C.).

The capacitor 32 is constructed, for example, as an electric double-layer capacitor (EDLC). A maximum value of the working voltage of the capacitor 32 employed in the electric vehicle 10 of the embodiment is higher than an inter-open-terminal voltage of the fuel cell 30.

The traction motor 36 is constructed, for example, as a known synchronous generator-motor that functions not only as a motor but also as a generator. The traction motor 36 is driven either as a motor or as a generator depending on a vehicle speed V and depression strokes of an accelerator pedal 83 and a brake pedal 85 operated by a driver. Mechanical brakes 13 capable of applying a braking force through mechanical operation of a disk brake or the like are respectively attached to the driving wheels 12, which are connected to the traction motor 36 via the differential gear 14.

An electric power line extending from the fuel cell 30 and the capacitor 32 is provided with a DC-DC converter 54 that converts a high voltage supplied from the fuel cell 30 and the capacitor 32 into a low voltage (e.g., 12V). The DC-DC converter 54 supplies electric power to a secondary battery 60 as a 12V-power source and an auxiliary 62 installed in a vehicle. This electric power line is also provided with a diode 58 that is oriented in such a direction that the fuel cell 30 can charge the capacitor 32. Thus, even when there is a high voltage on the side of the capacitor 32, no reverse current flows through the fuel cell 30.

The electronic control unit 70 is constructed as a microprocessor that is mainly composed of a CPU 72. In addition to the CPU 72, the electronic control unit 70 includes a ROM 74 in which processing programs and the like are stored, a RAM 76 in which data are temporarily stored, and input and output ports (not shown). A power-source voltage Vp obtained from a voltage sensor 52 installed between the capacitor 32 and the inverter 34 in parallel therewith, a rotational position obtained from a rotational position detection sensor 37 for detecting a position of a rotor of the traction motor 36, a shift position obtained from a shift position sensor 82 for detecting a position of a shift lever 81, an accelerator opening AP obtained from an accelerator pedal position sensor 84 for detecting a depression stroke of the accelerator pedal 83, a brake position BP obtained from a brake pedal position sensor 86 for detecting a depression stroke of the brake pedal 85, a vehicle speed V obtained from a vehicle speed sensor 88 for detecting a running speed of the vehicle, and the like are input to the electronic control unit 70 via the input ports. A drive signal for the mechanical brakes 13, a drive signal for the circulation pump 26, a drive signal for the air compressor 28, a switching signal for the inverter 34, a direct-current power conversion signal for the DC-DC converter 54, an open-close signal for the circuit breaker 56, a change-over signal for the change-over valve 50, and the like are output from the electronic control unit 70 via the output ports.

Figure 2:
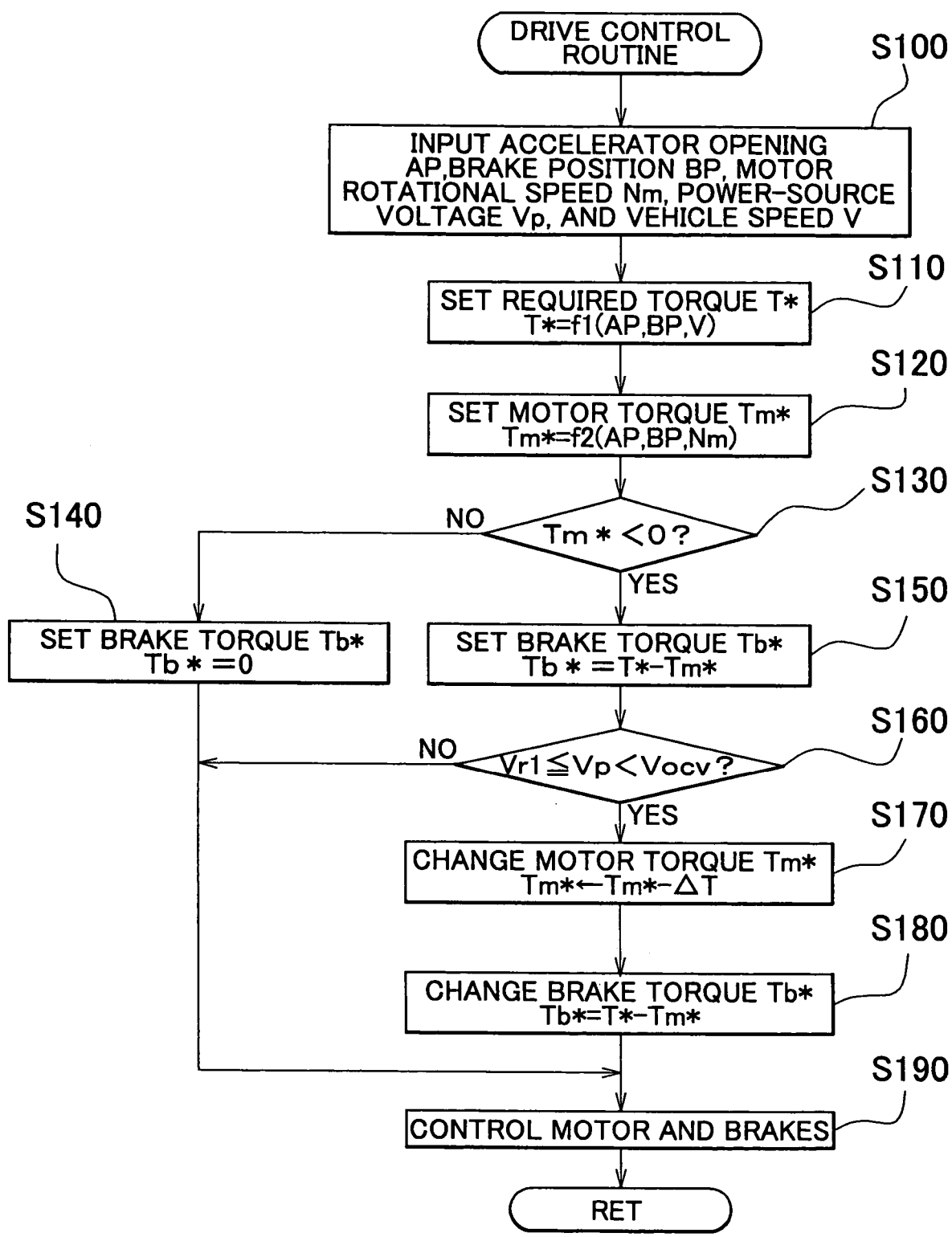
FIG. 2 is a flowchart showing an example of a drive control routine executed by an electronic control unit 70 of the embodiment.

Next, it will be described how the electric vehicle 10 of the embodiment constructed as described above operates especially at the time of braking. FIG. 2 is a flowchart showing an example of a drive control routine executed by the electronic control unit 70 of the embodiment. This routine is repeatedly executed at intervals of a predetermined period (e.g., 8 msec).

If the drive control routine is executed, the CPU 72 of the electronic control unit 70 first performs processings of inputting an accelerator opening AP obtained from the accelerator pedal position sensor 84, a brake position BP obtained from the brake pedal position sensor 86, a rotational speed Nm of the traction motor 36, a power-source voltage Vp obtained from the voltage sensor 52, a vehicle speed V obtained from the vehicle speed sensor 88, and the like (step S100). In the embodiment, the rotational speed Nm of the traction motor 36 is input as a value that is calculated on the basis of a rotational position of the rotor detected by the rotational position detection sensor 37 according to a rotational speed detection routine (not shown). However, the rotational speed Nm of the traction motor 36 may also be input as a value obtained from the vehicle speed V through conversion or a value detected by a sensor that is installed to directly detect a rotational speed of the traction motor 36.

Figure 3:
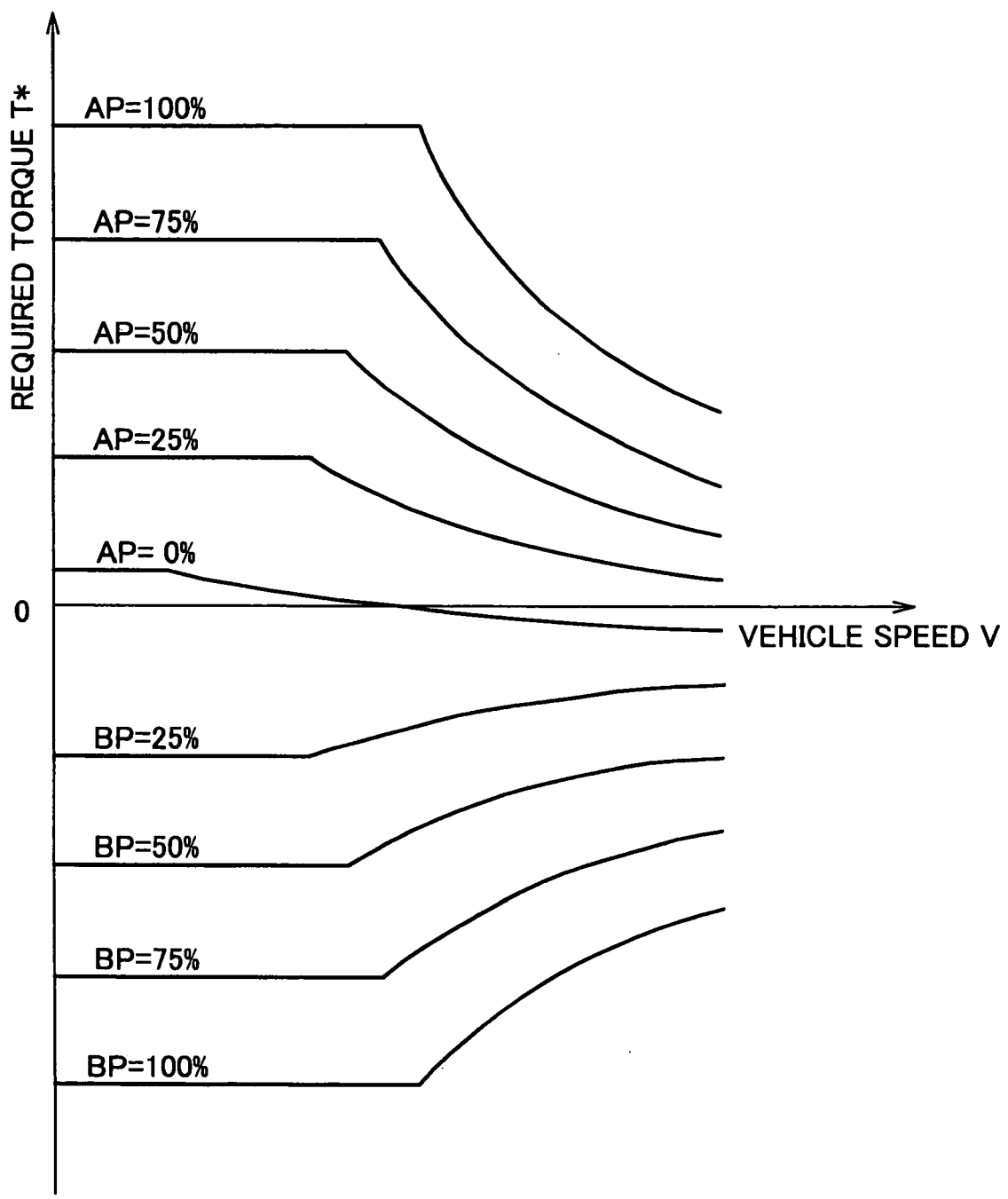
FIG. 3 is an illustrative view showing an example of a required torque setting map.

Then, a required torque T* required of the vehicle is set on the basis of the accelerator opening AP, the brake position BP, and the vehicle speed V that have been read (step S110). In the embodiment, the required torque T* is set as follows. A required torque setting map in which a relationship among the accelerator opening AP, the brake position BP, the vehicle speed V, and the required torque T* is set in advance is stored into the ROM 74. Once an accelerator opening AP, a brake position BP, and a vehicle speed V are given, a required torque T* corresponding to them is derived from the required torque setting map and then set. FIG. 3 shows an example of the required torque setting map.

Figure 4:
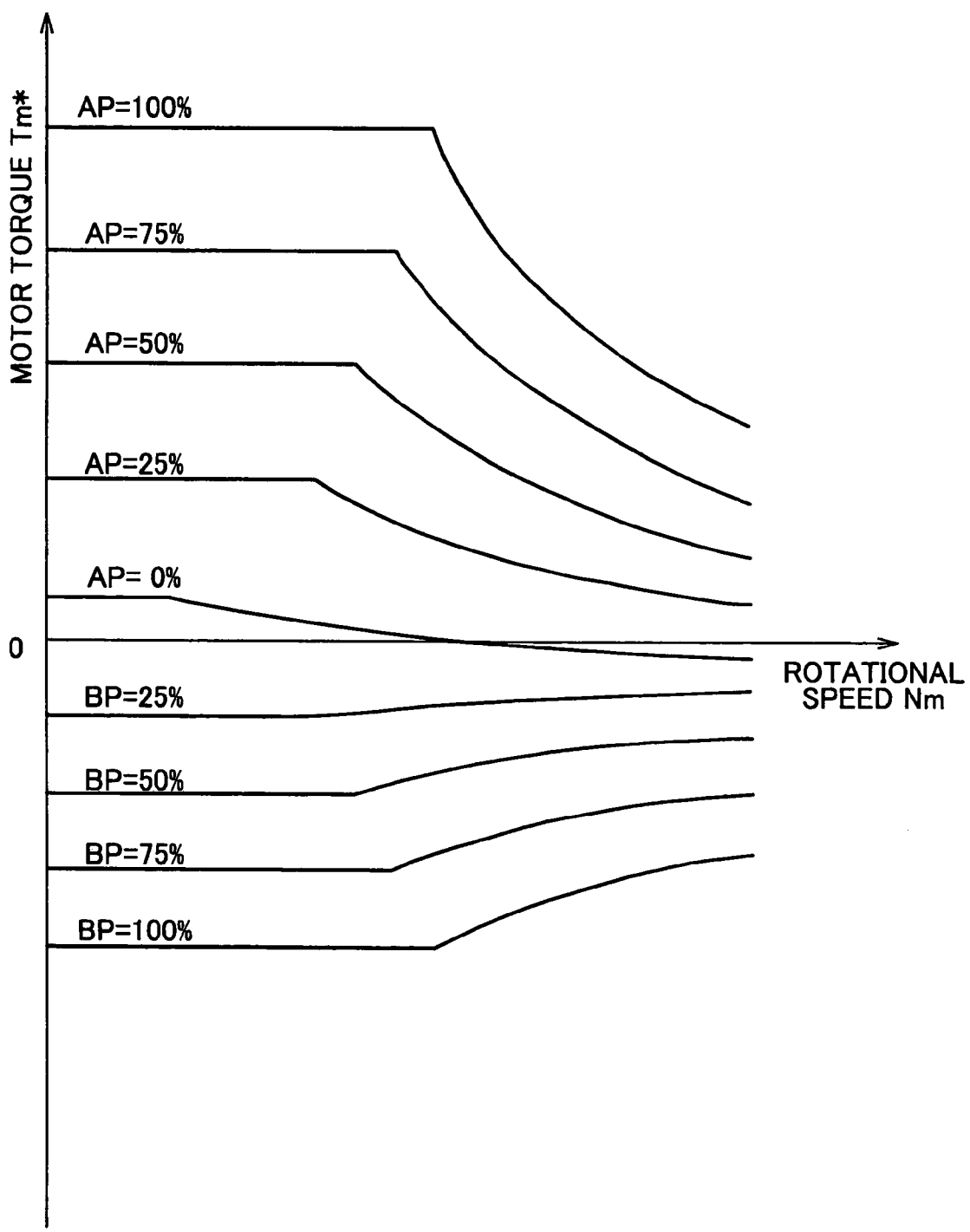
FIG. 4 is an illustrative view showing an example of a motor torque setting map.

Next, a torque Tm* to be output from the traction motor 36 (motor torque) is set on the basis of the accelerator opening AP, the brake position BP, and the rotational speed Nm of the motor (step S120). In the embodiment, the motor torque Tm* is set as follows. A motor torque setting map in which a relationship among the accelerator opening AP, the brake position BP, the rotational speed Nm, and the motor torque Tm* is set in advance is stored into the ROM 74. Once an accelerator opening AP, a brake position BP, and a rotational speed Nm are given, a motor torque Tm* corresponding to them is derived from the motor torque setting map and then set. FIG. 4 shows an example of the motor torque setting map. As is apparent from a comparison between FIG. 3 and FIG. 4, the motor torque Tm* is set as the same value as the required torque T* when setting a positive torque, whereas the motor torque Tm* is set as a value whose absolute value is smaller than the required torque T* when setting a negative torque. This is based on the reason that, in the embodiment, while the traction motor 36 is the only power source that applies a positive acceleration to the vehicle, the mechanical brakes 13 as well as the traction motor 36 serve as power sources that apply a negative acceleration to the vehicle. That is, the motor torque Tm* equal to a positive required torque T* is output from the traction motor 36 when the vehicle is driven at a positive acceleration, whereas both a braking force produced by the traction motor 36 and braking forces produced by the mechanical brakes 13 are used when the vehicle is driven at a negative acceleration, namely, when the vehicle is braked. A torque applied to the mechanical brakes 13 will be described later.

If the motor torque Tm* is thus set, it is determined whether or not the motor torque Tm* thus set is negative (step S130). This is equivalent to a processing of determining whether a positive acceleration or a negative acceleration (a braking force) is to be applied to the vehicle. As described above, since both the traction motor 36 and the mechanical brakes 13 are used when a braking force is applied to the vehicle, the processing of determining whether or not the motor torque Tm* is negative can also be regarded as a processing of determining whether or not both the traction motor 36 and the mechanical brakes 13 are to be used. If the motor torque Tm* is not negative, a torque (brake torque) Tb* to be applied to the mechanical brakes 13 is set as 0 (step S140) so as to prevent the mechanical brakes 13 from operating. Then, the traction motor 36 and the mechanical brakes 13 are controlled (step S190), and the present routine is terminated. More specifically, the traction motor 36 is controlled by converting direct-current power of a power-source voltage Vp supplied from the fuel cell 30 and the capacitor 32 into pseudo three-phase alternating current power through switching control of the inverter 34 such that the set motor torque Tm* is output from the traction motor 36, and by applying the pseudo three-phase alternating current power to the traction motor 36. The mechanical brakes 13 are controlled by canceling operation of the brakes.

On the other hand, if the motor torque Tm* is negative, the brake torque Tb* is set as a value obtained by subtracting the motor torque Tm* from the required torque T* (step S150), and it is determined whether or not the power-source voltage Vp is within a range from a threshold Vr1 to an inter-open-terminal voltage VOCV of the fuel cell 30 (step S160). If the power-source voltage Vp is within this range, a new motor torque Tm* is set as a value obtained by subtracting an adjusting value ΔT from the set motor torque Tm* (step S170), and the brake torque Tb* is reset as a value obtained by subtracting the newly set motor torque Tm* from the required torque T* (step S180). Then, the traction motor 36 and the mechanical brakes 13 are controlled (step S190), and the present routine is terminated. The motor torque Tm* is thus reset when the power-source voltage Vp is within the range from the threshold Vr1 to the inter-open-terminal voltage VOCV, with a view to increasing regenerative power produced by the traction motor 36 and quickly raising the power-source voltage Vp above the inter-open-terminal voltage VOCV. The reason for this will be described below.

Figure 5:
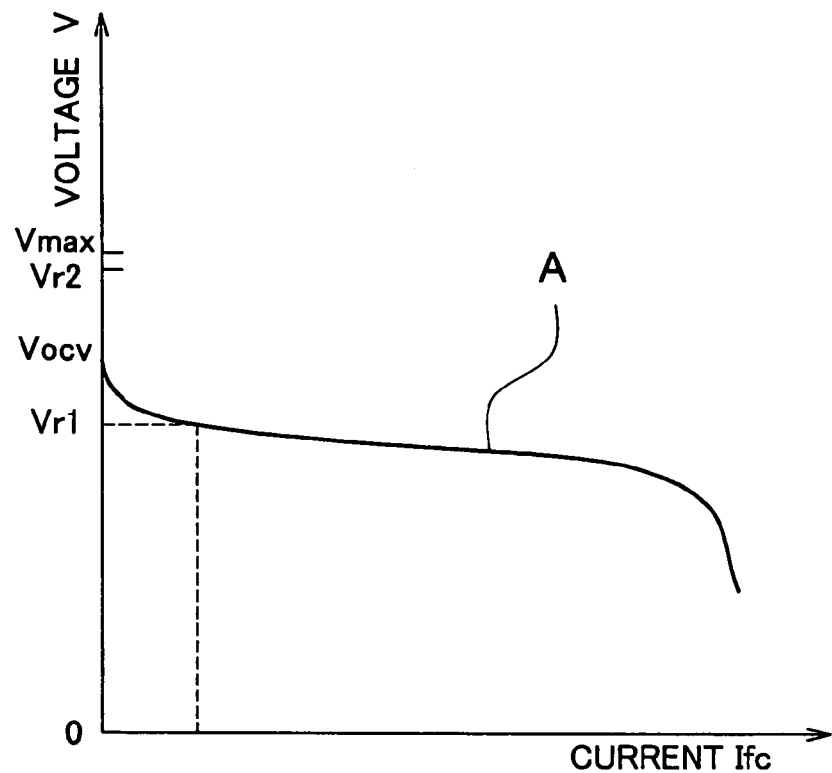
FIG. 5 is an illustrative view showing an example of a current-voltage characteristic (IV characteristic) of a fuel cell 30.

FIG. 5 shows an example of a current-voltage characteristic (IV characteristic) of the fuel cell 30. In FIG. 5, Vmax represents a maximum value of a working voltage of the capacitor 32, namely, a voltage of the capacitor 32 that is fully charged. A voltage Vr2 will be described later. Because the fuel cell 30 of the embodiment is constructed as a polymer electrolyte fuel cell, the operating efficiency thereof is lower in a region around the inter-open-terminal voltage VOCV than in the other regions, as is generally the case with a polymer electrolyte fuel cell. Thus, the regenerative power produced by the traction motor 36 is increased so as to quickly charge the capacitor 32 and thereby quickly pass the region of low operating efficiency. The fuel cell 30 is not operated in the region of low operating efficiency. In the related art, therefore, the circuit breaker 56 cuts the fuel cell 30 off if the power-source voltage Vp is within the region of low operating efficiency. In the related art as mentioned herein, however, the circuit-breaker 56 is cut off every time the driver treads on the brake pedal 85. Therefore, the circuit-breaker 56 operates more frequently and thus breaks down more frequently. If the power-source voltage Vp drops below the threshold Vr1 due to power running control of the traction motor 30 performed in response to depression of the accelerator pedal 83, the fuel cell 30 cut off by the circuit-breaker 56 is connected. Hence, an excessively large rush current flows from the fuel cell 30 to the capacitor 32 in some cases, although the power-source voltage Vp at the time when the fuel cell 30 is connected is more or less relevant to the occurrence of such a rush current. In such cases, a large current flows through the circuit-breaker 56, and an inconvenience such as sticking of the circuit-breaker 56 or the like is also caused. In order to avoid such an inconvenience, the embodiment is designed to keep the circuit-breaker 56 from cutting the fuel cell 30 off even in the region of low operating efficiency where the power-source voltage Vp is within the range from the threshold Vr1 to the inter-open-terminal voltage VOCV. Instead, the regenerative power produced by the traction motor 36 is increased so as to pass the region of low operating efficiency in a short time. As described already, the drive control routine shown in FIG. 2 is also used when the motor torque Tm* is positive, namely, when power running control of the traction motor 36 is performed. In the embodiment, therefore, the circuit-breaker 56 does not cut the fuel cell 30 off regardless of control of the traction motor 36 or the power-source voltage Vp. Thus, although a rush current may be produced and flow into the capacitor 32 as a result of connection of the fuel cell 30 in the related art, no such rush current is produced in the embodiment. Accordingly, the above-described processing of the embodiment serves to prevent an inconvenience such as sticking of the circuit-breaker 56 or the like from being caused by the flow of an unexpectedly large current between the fuel cell 30 and the capacitor 32, and to maintain high operating efficiency of the fuel cell 30. If the power-source voltage Vp rises above the inter-open-terminal voltage VOCV, the power-source voltage Vp is applied to the side of the circuit-breaker 56 (the side of the fuel cell 30). However, since the diode 58 is installed in the electric vehicle 10 of the embodiment, the power-source voltage Vp applied to the side of the fuel cell 30 never becomes higher than the inter-open-terminal voltage VOCV.

If it is determined in the processing of step S160 that the power-source voltage Vp is not within the range from the threshold Vr1 to the inter-open-terminal voltage VOCV, there is no need to perform the processing of increasing the regenerative power produced by the traction motor 36. Thus, the traction motor 36 and the mechanical brakes 13 are controlled such that the motor torque Tm* set in step S120 and the brake torque Tb* set in step S150 are output from the traction motor 36 and the mechanical brakes 13 respectively (in step S190), and the present routine is terminated. The mechanical brakes 13 are controlled such that the set brake torque Tb* is applied thereto, for example, by adjusting a force to be applied to pads of the disk brake.

According to the electric vehicle 10 of the embodiment described hitherto, the circuit-breaker 56 does not cut the fuel cell 30 off regardless of control of the traction motor 36 or the power-source voltage Vp. Therefore, by reducing the frequency with which the circuit-breaker 56 operates, the frequency with which the circuit-breaker 56 breaks down can be reduced, and an inconvenience that may be caused when the fuel cell 30 is connected, for example, sticking of the circuit-breaker 56 or the like can be avoided. Besides, since the diode 58 is oriented in such a direction that the fuel cell 30 can charge the capacitor 32, the power-source voltage Vp applied to the side of the fuel cell 30 does not become higher than the inter-open-terminal voltage VOCV of the fuel cell 30. If the fuel cell 30 is in the region of low operating efficiency where the power-source voltage Vp is within the range from the threshold Vr1 to the inter-open-terminal voltage VOCV, the regenerative power produced by the traction motor 36 is increased and the charging of the capacitor 32 is promoted so as to pass the region of low operating efficiency in a short time. As a result, high operating efficiency of the fuel cell 30 can be maintained.

In the electric vehicle 10 of the embodiment, the capacitor 32 is connected to the electric power line in parallel with the fuel cell 30. However, a plurality of capacitors may be connected in parallel and may be sequentially charged during regeneration of the traction motor 36. This case will be described hereinafter referring to an electric vehicle 10B in accordance with a second embodiment of the invention. The electric vehicle 10B of the second embodiment is identical in construction with the electric vehicle 10 of the first embodiment, aside from the capacitor 32. Accordingly, the description irrelevant to a part corresponding to the capacitor 32 would be redundant. For this reason, all the other parts will not be described or shown in the drawings. In the following description of the electric vehicle 10B of the second embodiment, the same reference numerals as in the electric vehicle 10 of the first embodiment are used.

Figure 6:
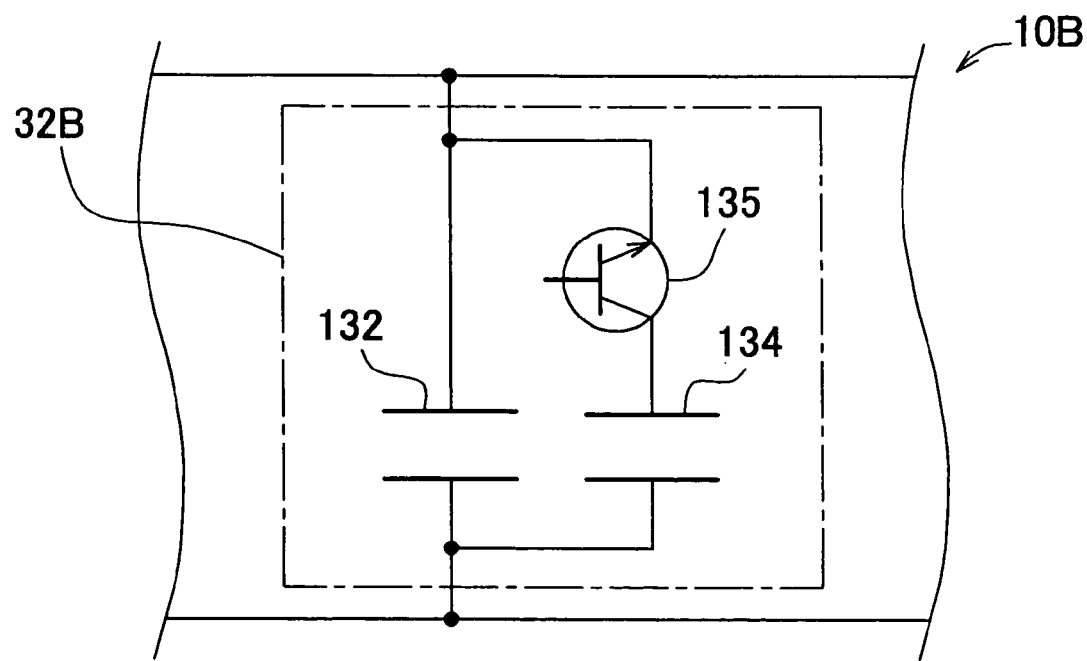
FIG. 6 is a block diagram showing the overall construction of a capacitor unit 32B provided in an electric vehicle 10B in accordance with a second embodiment of the invention.

FIG. 6 is a block diagram showing the overall construction of a capacitor unit 32B provided in the electric vehicle 10B of the second embodiment. The capacitor unit 32B corresponds to the capacitor 32 of the first embodiment. As shown in FIG. 6, the capacitor unit 32B of the second embodiment is constructed such that two identical capacitors (a first capacitor 132 and a second capacitor 134) are connected in parallel and that a switch element 135 is connected in series to the second capacitor 134. The sum of capacitances of the first and second capacitors 132 and 134 is equal to the capacitance of the capacitor 32 of the first embodiment. The switch element 135 is connected to an output port of the electronic control unit 70 through a signal line. The electronic control unit 70 performs on-off control of the switch element 135.

Figure 7:
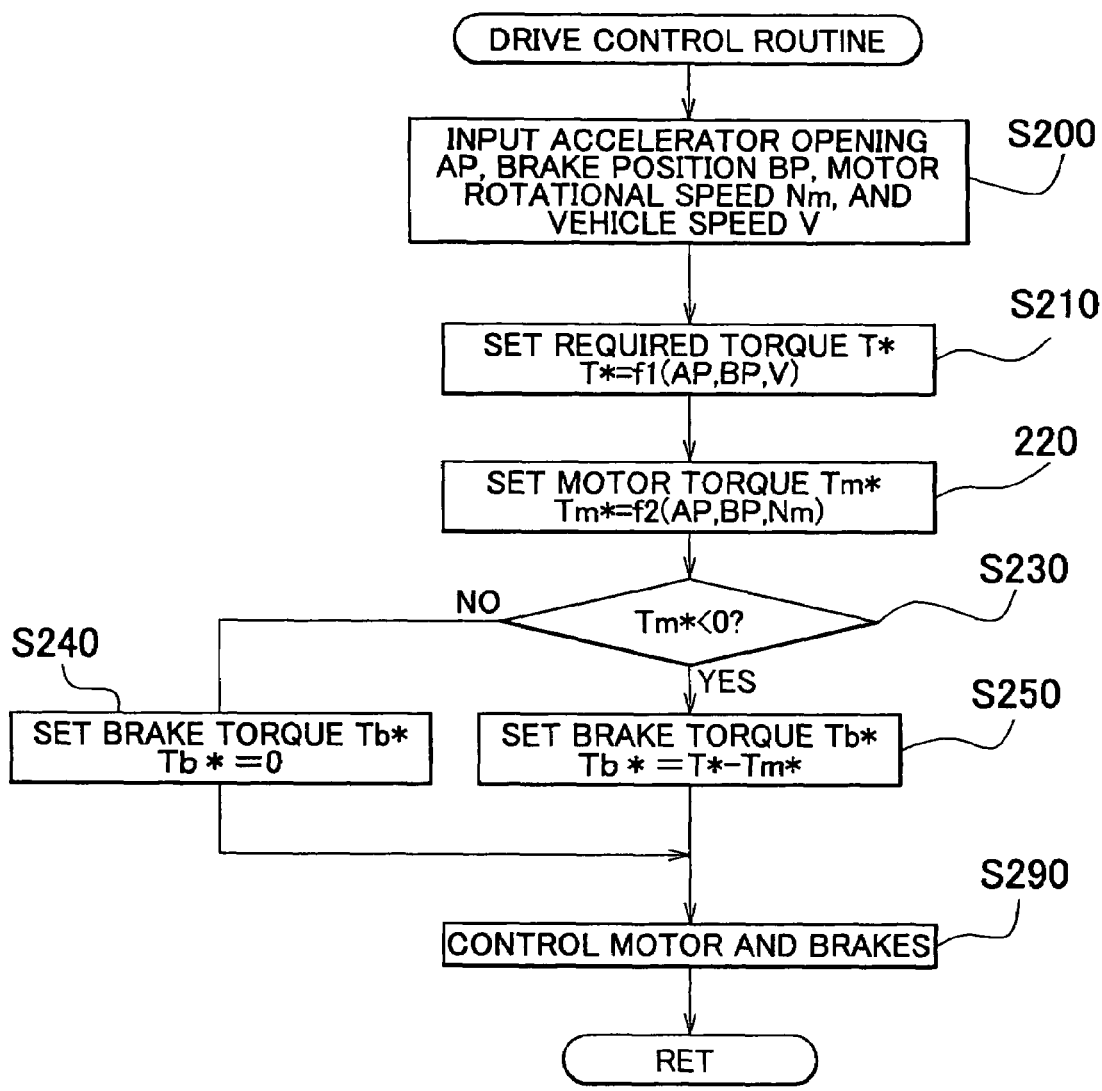
FIG. 7 is a flowchart showing an example of a drive control routine executed by an electronic control unit 70 of the second embodiment.

Next, it will be described how the electric vehicle 10B of the second embodiment constructed as described above operates especially at the time of braking. FIG. 7 is a flowchart showing an example of a drive control routine executed by the electronic control unit 70 of the second embodiment. This drive control routine is obtained by removing the processings S160 to S180 from the drive control routine shown in FIG. 2. That is, regardless of the value of a power-source voltage Vp, the traction motor 36 and the mechanical brakes 13 are controlled such that a motor torque Tm* and a brake torque Tb* that are set on the basis of an accelerator opening AP, a brake position BP, a vehicle speed V, and a motor rotational speed Nm are output from the traction motor 36 and the mechanical brakes 13 respectively. In the electric vehicle 10 of the second embodiment as well, the circuit-breaker 56 is kept from cutting the fuel cell 30 off regardless of control of the traction motor 36 or the power-source voltage Vp.

Figure 8:
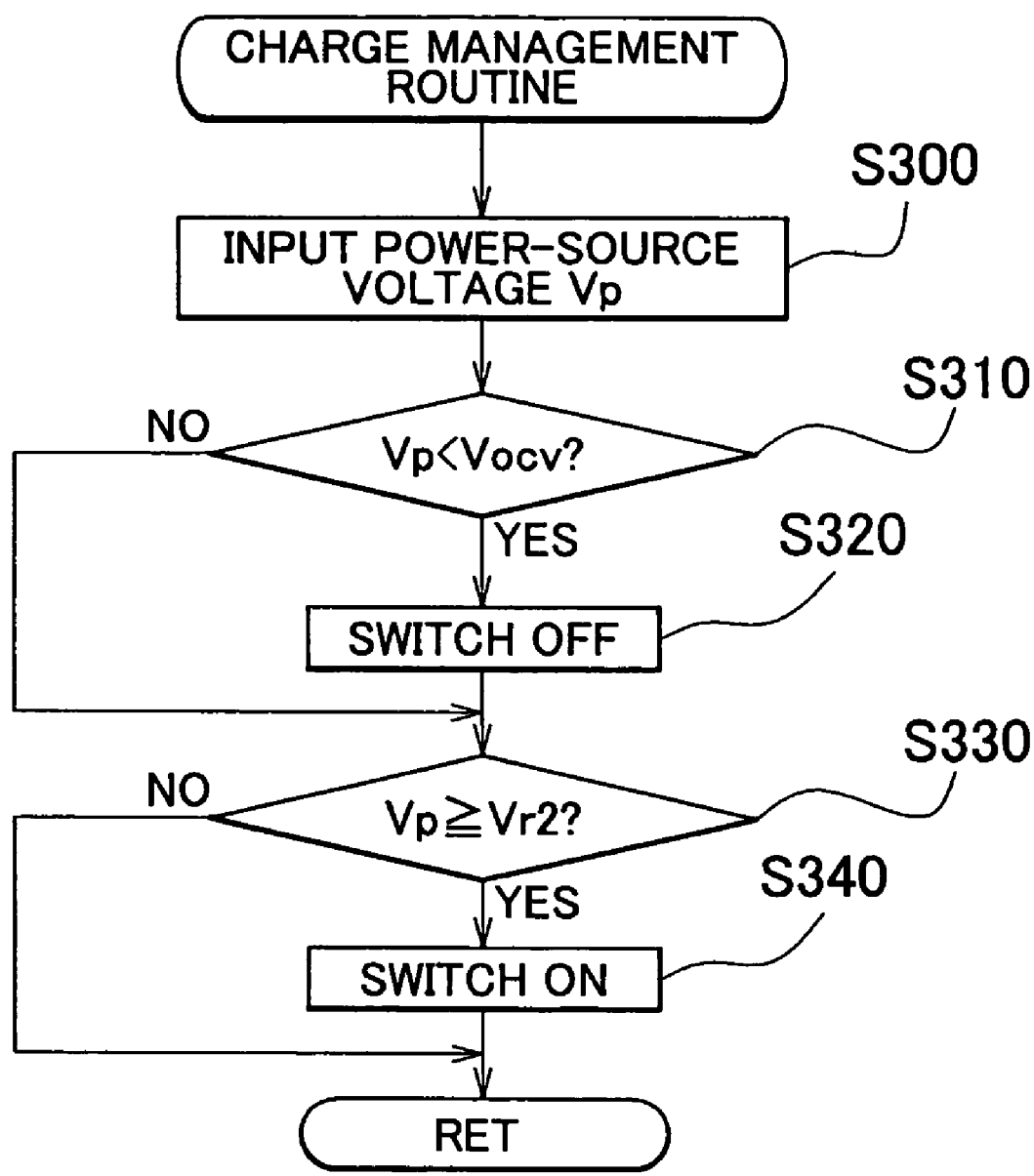
FIG. 8 is a flowchart showing an example of a charge management routine.

In the electric vehicle 10 of the second embodiment, a charge management routine shown in FIG. 8 as an example is executed in addition to the aforementioned drive control routine. The charge management routine is executed when the motor torque Tm* is negative, namely, when regenerative control of the traction motor 36 is performed. If the charge management routine is executed, the CPU 72 of the electronic control unit 70 first reads a power-source voltage Vp obtained from the voltage sensor 52 (step S300), and performs a processing of comparing the read power-source voltage Vp with an inter-open-terminal voltage VOCV (step S310). If the power-source voltage Vp is lower than the inter-open-terminal voltage VOCV, the switch element 135 is turned off (step S320).

Then, it is determined whether or not the power-source voltage Vp is equal to or higher than a threshold Vr2 (step S330). If the power-source voltage Vp is equal to or higher than the threshold Vr2, the switch element 135 is turned on (step S340), and the present routine is terminated. The threshold Vr2 is set higher than the inter-open-terminal voltage VOCV and slightly lower than a maximum working voltage Vmax of the capacitor unit 32B. The voltage Vr2 shown in FIG. 5 is equal to the threshold Vr2.

Thus, this charge management routine is terminated by turning the switch element 135 off if the power-source voltage Vp is lower than the inter-open-terminal voltage VOCV, and by turning the switch element 135 on if the power-source voltage Vp is equal to or higher than the threshold Vr2. That is, during regeneration of the traction motor 36, the switch element 135 is first turned off, so that only the first capacitor 132 is charged. If the first capacitor 132 is almost fully charged, the switch element 135 is turned on, so that the second capacitor 134 is charged. Accordingly, in the electric vehicle 10B of the second embodiment, after the first capacitor 132 whose capacitance is half of the capacitance of the capacitor 32 of the electric vehicle 10 of the first embodiment has been charged, the second capacitor 134 is charged. Therefore, the first capacitor 132 is quickly charged. As a result, the region where the fuel cell 30 exhibits low operating efficiency, namely, the region where the power-source voltage Vp is within the range from the threshold Vr1 to the inter-open-terminal voltage VOCV can be passed in a short time.

According to the electric vehicle 10B of the second embodiment described hitherto, on-off control of the switch element 135 is performed for the first and second capacitors 132 and 134 connected in parallel such that only the first capacitor 132 is charged during regeneration of the traction motor 36, and that the second capacitor 134 is charged after the first capacitor 132 has been almost fully charged. Therefore, the region where the fuel cell 30 exhibits low operating efficiency, namely, the region where the power-source voltage Vp is within the range from the threshold Vr1 to the inter-open-terminal voltage VOCV can be passed in a short time. As a result, high operating efficiency of the fuel cell 30 can be maintained. In the first place, in the electric vehicle 10B of the second embodiment as well, the circuit-breaker 56 is kept from cutting the fuel cell 30 off regardless of control of the traction motor 36 or the power-source voltage Vp. Therefore, by reducing the frequency with which the circuit-breaker 56 operates, the frequency with which the circuit-breaker 56 breaks down can be reduced, and an inconvenience that may be caused when the fuel cell 30 is connected, for example, sticking of the circuit-breaker 56 or the like can be avoided. Besides, since the diode 58 is oriented in such a direction that the fuel cell 30 can charge the capacitor 32, the power-source voltage Vp applied to the side of the fuel cell 30 does not become higher than the inter-open-terminal voltage VOCV of the fuel cell 30.

In the electric vehicle 10B of the second embodiment, the two capacitors of the same capacitance are connected in parallel. Instead, however, two capacitors of different capacitances may be connected in parallel. The number of capacitors to be connected in parallel should not be limited to two. That is, three or more capacitors may be connected in parallel.

In the electric vehicle 10 of the first embodiment and the electric vehicle 10B of the second embodiment, a polymer electrolyte fuel cell that generates electricity by hydrogen supplied from the high-pressure hydrogen tank 22 is installed as the fuel cell 30. Instead, however, a polymer electrolyte fuel cell provided with a reformer that reforms hydrocarbon fuel into hydrogen-rich fuel gas and that supplies the fuel cell 30 with the hydrogen-rich fuel gas may be installed. It is also appropriate to install a fuel cell that is different in type from a polymer electrolyte fuel cell.

In the electric vehicle 10 of the first embodiment and the electric vehicle 10B of the second embodiment, the single traction motor 36 is employed. As a matter of course, however, the electric vehicle 10 and the electric vehicle 10B may also be constructed such that two wheel-in motors built in the driving wheels 12 are employed or that different motors are respectively attached to different axles, namely, a front-wheel axle and a rear-wheel axle.

The embodiments have been described on the assumption that the drive unit of the invention is installed in an electric vehicle. However, the drive unit described above may be installed not only in a vehicle but also in a moving object such as a railway carriage, a ship, an aircraft or the like. The drive unit may also assembled into an equipment other than a moving object. For instance, the drive unit may be used to drive a construction equipment.

Although the modes of implementing the invention have been described with reference to the embodiments thereof, it is inarguably obvious that the invention is not limited to those embodiments at all and can be implemented in various forms without departing from the spirit thereof.

What is claimed is:

1. A drive unit comprising:
a motor that can input/output motive power to/from a drive shaft;
a drive circuit that performs drive control of the motor;
a fuel cell that is connected to the drive circuit without the intervention of a voltage converter such that electric power can be output;
a charge/discharge portion that is connected to the fuel cell in parallel and to the drive circuit such that electric power can be output, and that has at least one capacitor whose voltage in a fully charged state is higher than an inter-open-terminal voltage of the fuel cell;
a diode that is installed between the fuel cell and the charge/discharge portion such that electric power can be output only in a direction from the fuel cell to the charge/discharge portion; and
a drive control portion that controls the drive circuit such that drive control of the motor is performed on the basis of required motive power to be transmitted to the drive shaft,
wherein the drive circuit performs drive control of the motor through the output of electric power from the charge/discharge portion or the output of electric power from the charge/discharge portion and the fuel cell.

2. The drive unit according to claim 1, wherein
the fuel cell is connected such that electric power can be output to the drive circuit via the charge/discharge portion.

3. The drive unit according to claim 1, further comprising:
a voltage detection portion that detects an inter-terminal voltage of the charge/discharge portion,
wherein
the drive control portion controls the drive circuit in such a manner as to increase regenerative power produced through regenerative control of the motor if an inter-terminal voltage detected by the voltage detection portion during regenerative control of the motor is between an inter-open-terminal voltage of the fuel cell and a predetermined voltage lower than the inter-open-terminal voltage.

4. The drive unit according to claim 3, further comprising:
a braking force application portion that applies a braking force to the drive shaft through mechanical operation and that is drivingly controlled by the drive control portion,
wherein
if the required motive power to be transmitted to the drive shaft is a braking force, the drive control portion divides the required motive power into a first braking force that is to be produced through regenerative control of the motor and a second braking force that is to be produced by the braking force application portion, and controls the drive circuit and the braking force application portion such that the first braking force and the second braking force are applied to the drive shaft; and
the drive control portion then controls the drive circuit and the braking force application portion such that the first braking force increases if an inter-terminal voltage detected by the voltage detection portion during regenerative control of the motor is within a predetermined range including an inter-open-terminal voltage of the fuel cell.

5. The drive unit according to claim 1, further comprising:
a cut-off portion that can cut the fuel cell off from the drive circuit,
wherein
the drive control portion controls the cut-off portion such that the fuel cell is not cut off from the drive circuit when motive power is input to or output from the drive shaft by the motor.

6. The drive unit according to claim 5, wherein
the drive control portion controls the cut-off portion such that the fuel cell is not cut off from the drive circuit either when regenerative control of the motor is performed.

7. The drive unit according to claim 1, wherein
the charge/discharge portion is composed of a plurality of capacitors that are connected in parallel.

8. The drive unit according to claim 7, wherein
the charge/discharge portion has a connection switch for connecting or disconnecting at least one of the capacitors.

9. The drive unit according to claim 8, further comprising:
a voltage detection portion that detects an inter-terminal voltage of the charge/discharge portion,
wherein the drive control portion controls the connection switch such that the at least one of the capacitors is disconnected if regenerative control of the motor is performed, and such that the at least one of the capacitors that has been disconnected is connected if an inter-terminal voltage detected by the voltage detection portion becomes higher than an inter-open-terminal voltage of the fuel cell by a predetermined voltage with the at least one of the capacitors having been disconnected.

10. A vehicle comprising the drive unit of claim 1, wherein
the drive shaft of the drive unit is mechanically connected to at least one of axles of the vehicle.

11. A method of controlling a drive unit having a motor that can input/output motive power to/from a drive shaft, a drive circuit that performs drive control of the motor, a fuel cell that outputs electric power to the drive circuit, a charge/discharge portion that is connected to the fuel cell in parallel and that outputs electric power to the drive circuit, a braking force application portion that applies a braking force to the drive shaft through mechanical operation, and a drive control portion that controls the drive circuit and the braking force application portion such that drive control of the motor is performed on the basis of required motive power to be transmitted to the drive shaft, comprising the steps of:
measuring electric power input to the drive circuit;
determining whether or not the required motive power to be transmitted to the drive shaft is a braking force; and
applying a braking force produced through regenerative control of the motor to the drive shaft as a force larger than a braking force produced by the braking force application portion if the required motive power is a braking force while the electric power is within a predetermined range.

* * * * *